INVENTOR.
ROBERT A. ARTHUR
ATTORNEY

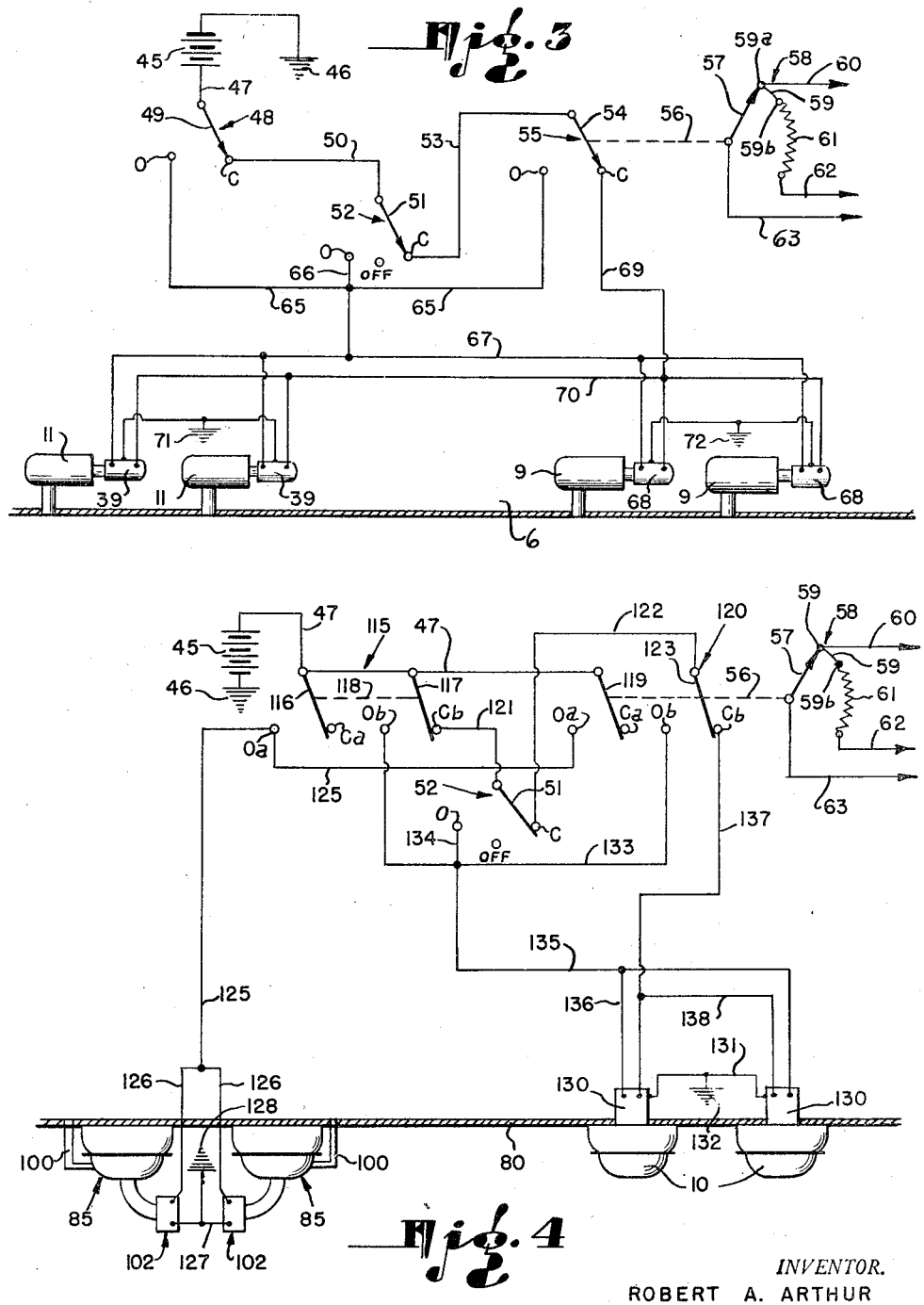

United States Patent Office 2,773,440
Patented Dec. 11, 1956

2,773,440

SURGE RELIEF MEANS

Robert A. Arthur, Culver City, Calif., assignor to The Garrett Corporation, Los Angeles, Calif., a corporation of California Application February 24, 1949, Serial No. 78,195

11 Claims. (Cl. 98—1.5)

This invention relates to auxiliary flow control mechanism for pressurized enclosures such as aircraft cabins, such auxiliary flow control mechanism being adapted for use in addition to (and in conjunction with) the main pressure control valve or valves.

While the invention may be used in other connections, it has particular utility in pressurized aircraft, and will be shown and described relative thereto.

In aircraft which are provided with the usual pressurizing and ventilating equipment and control mechanism therefor, certain problems arise which are not adequately solved by present equipment, the difficulties usually occurring under special circumstances as when there is a sudden surge of air pressure in the cabin which frequently is so severe as to cause the occupants of the cabin considerable discomfort.

This is particularly true in aircraft pressurizing systems wherein the inflow from the superchargers is greater than the rated capacity of the regulators, these regulators being termed herein the main regulators so as to avoid confusion with other mechanism to be described later.

Under normal operating conditions, when only these regulators are used, said regulators are capable of handling considerably more air than that for which they are rated, due to the higher differential pressure across them as the aircraft ascends, as well as cabin leakage under similar conditions. Further, there is usually a decrease in the air delivery from the superchargers as greater altitude is attained.

One occasion when the above referred to sudden surge may occur, is at take-off time, and another occasion is when the auxiliary vent doors are suddenly closed during flight.

It is therefore an object of the present invention to solve this surge problem and minimize or substantially eliminate the sudden pressure rise which would otherwise result in discomfort to the occupants.

The problem is solved by the present invention by providing auxiliary means which will permit the escape of excessive air from the cabin at the ground running and take-off period, but which would become inoperative for pressurized flight when said means is not required and when, as a matter of fact, it is not desired, as the main regulators will better control the cabin pressure without the functioning of said auxiliary means.

Another object of the present invention is to provide such auxiliary means or regulators, having valves which close slowly, depending upon the pressure change within the cabin. As these valves close slowly during the time when pressure surges are likely to occur, any tendency in the direction of a sudden or abnormal rise in cabin pressure causes said valves to either stop moving toward closed position, or, under certain circumstances, to force same toward a more open position. The reverse of the above action will result upon a sudden drop in cabin pressure occurring as said valves are closing.

By reason of the slow closing of the valves of the auxiliary regulators the main regulators will gradually take over the control of cabin pressure with little or no "bump." After the auxiliary valves have closed and the auxiliary regulating means becomes inoperative, the main regulators will handle the decreased airflow through them as normal pressurization takes place.

It is a further object of the invention to provide means of the present character which is controlled automatically with the raising and lowering of the landing gear and/or opening and closing of the auxiliary vent doors.

This is effected by providing the auxiliary regulators with means for effecting opening and closing of the valves thereof along with or substantially simultaneously with the opening and closing of the valves of the main regulators.

Taking one type of installation as an example, the valves of the main regulators are positively opened wide when the aircraft is on the ground or when the auxiliary vent doors are opened, by electrically operated jacks.

The auxiliary regulators are also provided with electrically controlled means for effecting opening and closing of the valves thereof and are connected with the landing gear switch and/or switch of the auxiliary vent doors so that the valves of both the main regulators and the auxiliary regulators open and close according to the position of said switches.

Other objects and advantages of the invention will be brought out in the following part of the specification.

Referring to the drawings, which are for illustrative purposes only,

Fig. 3 is a diagrammatic view showing the wiring system of one arrangement; and

Fig. 4 is a diagrammatic view showing the wiring system of another arrangement.

Figure 1:
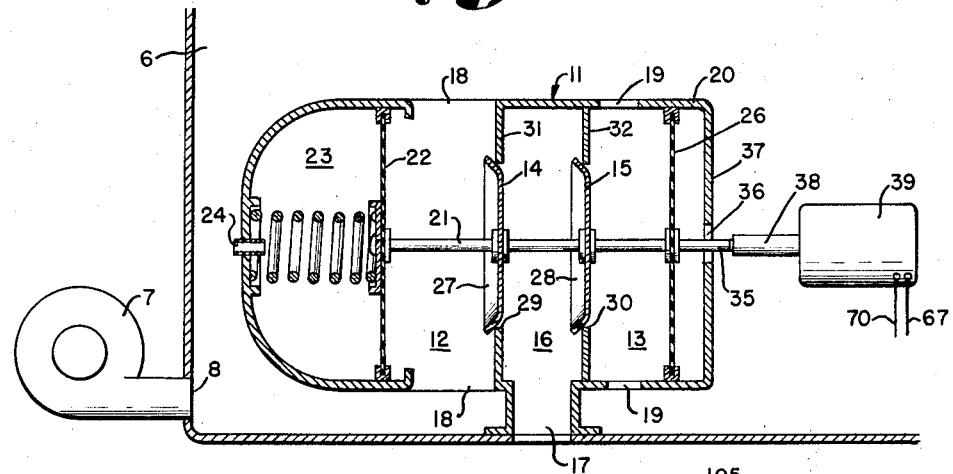
Fig. 1 is a diagrammatic section of a regulator embodying the present invention.

Referring to Fig. 1, there is shown an aircraft cabin pressurizing arrangement in which the air under pressure is delivered to the cabin 6 by a supercharger, conventionally indicated at 7, through an inlet 8, and the pressure within the cabin is controlled by controlling the escape of air through the outlets of the main regulator units 9 (Fig. 3) or 10 (Fig. 4). The main regulator units 9 may be of the type disclosed in the application of James M. Kemper, Serial No. 556,790, for Cabin Pressure Regulator, filed October 2, 1944, now Patent No. 2,463,491, and the main regulator units 10 may be of the type disclosed in the application of Arthur et al., Serial No. 776,842, for Regulator, filed September 29, 1947, now Patent No. 2,531,100.

There is also shown in Fig. 1 an auxiliary regulator, indicated generally at 11, which has a pair of annular chambers 12 and 13 providing parallel paths for the flow of air from the cabin past balanced valves 14 and 15, into an intermediate chamber 16, from which it may escape to atmosphere by way of an outlet 17, air from the cabin entering chambers 12 and 13 through openings 18 and 19 respectively, in the casing 20. The flow valves 14 and 15 are mounted on a shaft 21 having one end connected to a pressure differential responsive means in the form of a diaphragm 22 which responds to the differential existing between cabin pressure, exerted against the right side thereof (as viewed in Fig. 1), and the pressure in a chamber 23 acting against the left side thereof. Thus the valves 14 and 15 are actuated by the diaphragm 22. The chamber 23 has a calibrated restricted connection 24 with the cabin, and a spring 25 urges the diaphragm to the right (Fig. 1), and the valves 14 and 15 closed.

Adjacent the opposite or right-hand end of the shaft 21 there is marginally supported within the casing 20 a flexible supporting spider or diaphragm 26 through which the shaft 21 extends and to which said shaft is attached. With this type of mounting the movement of the valves 14 and 15 is of a floating character, virtually free from frictional resistance. The valves are formed of light sheet metal discs having very little inertia, and the diaphragm 22 has a dash pot action with respect to the chamber 23. Consequently, the valves are not affected to any appreciable extent by maneuvering of the aircraft. The valves have conical rims 27, 28, adapted to coact with the edges of circular openings 29, 30, in partition walls 31, 32, to define the valve openings.

The effect upon the valve 14 of the airstream flowing from the chamber 12 into the chamber 16 is balanced by the effect against the valve 15, of the oppositely directed airstream flowing from the chamber 13 into the chamber 16. Consequently, the valves 14, 15 are balanced and are not per se responsive to pressure or airflow, and are not affected by changes therein.

The end portion 35 of the shaft 21 adjacent the diaphragm 26 extends outwardly through an opening 36 in the adjacent end wall 37 of the casing 20. The opening 36 is larger than the cross sectional area of the shaft 35 so as not to interfere with the floating action of the valves and to prevent the spider or diaphragm from being airbound. The portion 35 of the shaft 21 is adapted to be engaged by a shaft 38 of an electrically operated jack 39 of any well-known type, such, for example, as is shown in Chapman Patent No. 2,407,537, issued September 10, 1946, for effecting positive opening of the valves 14, 15, as will be hereinafter described.

In Fig. 3 there is shown an electrical wiring system which includes a source of electrical energy indicated as a battery 45 having one terminal grounded at 46 and having the opposite terminal connected by a wire 47, to a landing gear switch, indicated generally at 48, having a movable switch element 49, which is automatically controlled in the well known manner. When the weight of the plane is off the landing gear, the switch member 49 is in the position shown in Fig. 3, contacting the fixed contact C. The other fixed switch member is indicated by the letter O and is engaged by the member 49 when the weight of the plane is on the landing gear. The fixed contact C is connected by a wire 50 with a movable switch member 51 of a manually operated regulator override switch, indicated generally at 52, which is provided with a fixed contact C, a fixed contact O, and an off contact, as shown in Fig. 3. The contact C of the switch 52 is connected by a wire 53 with a movable contact member 54 of an auxiliary vent switch 55. The switch 55 also includes a fixed contact C and a fixed contact O. The movable switch member 54 is connected by suitable means, indicated by the dotted line 56, with a movable switch member 57 of an auxiliary vent door control mechanism, indicated generally at 58, and which includes a contact 59 having a wire 60 connected thereto at one end, and having one end of a resistance coil 61 connected at its other end. The opposite end of the resistance coil 61 is provided with a wire 62, and a wire 63 is connected to the movable switch member 57. The resistance coil 61 is part of a potentiometer mechanism for controlling the opening and closing of the auxiliary vent door or doors, said potentiometer mechanism operating in the well known manner. It is to be understood that the wires 60, 62 and 63 are connected to the rest of the potentiometer mechanism in the well known manner.

Briefly, should it be desired to open the auxiliary vent door or doors, the movable switch member 57 is actuated in a clockwise direction, and as it moves from the free end 59a to the opposite end 59b the switch member 54 is moved clockwise from the fixed contact C to the fixed contact O of the switch 55. Throughout the movement of the switch member 57 between the points 59a and 59b there will be no change or unbalancing of the potentiometer 58. As the switch member 57 moves further in the clockwise direction along the resistance coil 61, the potentiometer is unbalanced in accordance with the position of said member 57 on said coil, and the auxiliary vent door or doors will be opened accordingly to a position determined by the setting of the switch member 57 on the coil 61. As the switch member 57 passes the point 59b, the switch member 54 remains in contact with the fixed contact O of the switch 55. Any suitable arrangement may be employed to effect this result, such as a lost motion connection between the switch members 57 and 54, or by lengthening the contact O of the switch 55 along the arc described by the free end of the switch member 54. When the switch member 57 is moved in the counterclockwise direction, the potentiometer arrangement will effect closing of the auxiliary vent door or doors, the action being the reverse of that described above in connection with effecting the opening of said door or doors.

The fixed contacts O of the respective switches 48, 52 and 55 are connected together by wires 65 and 66, and the wire 65 is connected to a wire 67 connected to the motors of the jacks 39 of the auxiliary regulators, and also connected to the motors of the jacks 68 of the main regulators 9. The motors of the respective jacks are operated in the opening direction when energized through the wire 67.

The contact C of the switch 55 is connected by a wire 69, to a wire 70 connecting the coils of the motors of the jacks which will effect reverse operation of said members in the closing direction when energized through said wire 70. The motors of the jacks 39 also have a ground 71, and the motors of the jacks 68 have a ground 72.

When the aircraft is on the ground the main and auxiliary regulator valves are opened by the jacks 68 and 39 respectively, it being understood that when the weight of the plane is on the landing gear the switch member 49 of the automatic landing gear switch 48 is contacting the fixed contact O of said switch 48, the switch 52 being set as shown in Fig. 3. With the switch member 49 on the O contact of the switch 48, the jack motors operate in the direction to effect full opening of the outflow valve of the main regulators 9 and the valves 14, 15 of the auxiliary regulators 11.

The switch 55 will be set as shown in Fig. 3, or if desired, the auxiliary vent door or doors may be opened as above described. Also, the main cabin door or doors may be open and/or a window or windows may be open.

Preparatory to take-off the various doors and/or windows which may be open are closed, and as the take-off is made and the weight is removed from the landing gear, the switch member 49 of the switch 48 is moved to the C contact which effects actuation of the jacks in a direction to permit the flow valves of the main and auxiliary regulators to move toward closed position.

Due to the restriction of the bleed 24 from the cabin to the chamber 23, air from said cabin enters the chamber very slowly so that the valves 14, 15, close very slowly. At this time there is a high air delivery to the cabin by the supercharger 7, and if the cabin pressure tends to increase faster than the chamber pressure the valves 14, 15 tend to open due to the differential of pressure on opposite sides of the diaphragm 22. Should there be a drop in cabin pressure at this time, the pressure in the chamber 23 would effect movement of the valves 14, 15 in the closing direction. This arrangement permits the main regulators to take over gradually with little or no pressure surge or "bump," and when the valves 14, 15 of the auxiliary regulators reach the closed position, said auxiliary regulators become inoperative and permit the main regulators to handle the decreased airflow through them as pressurization takes place.

Should it be desired to open the auxiliary vent doors during flight, the switch member 57 is moved clockwise as above described, and the switch member 54 is moved to contact the O position of the switch 55, thus effecting opening of the outflow valves of the main regulators 9 and the auxiliary regulators 11. Upon subsequent closing of the auxiliary vent doors by suitable movement of the switch member 57, the reverse action will take place in a manner similar to that described above in connection with the take-off.

The manual override switch 52 may also control the opening and closing of the outflow valves of the main and auxiliary regulators. They may be "inched" toward closed or open position, or stopped at any point in their travel, in order to manually control pressure as may be desired.

Figure 2:
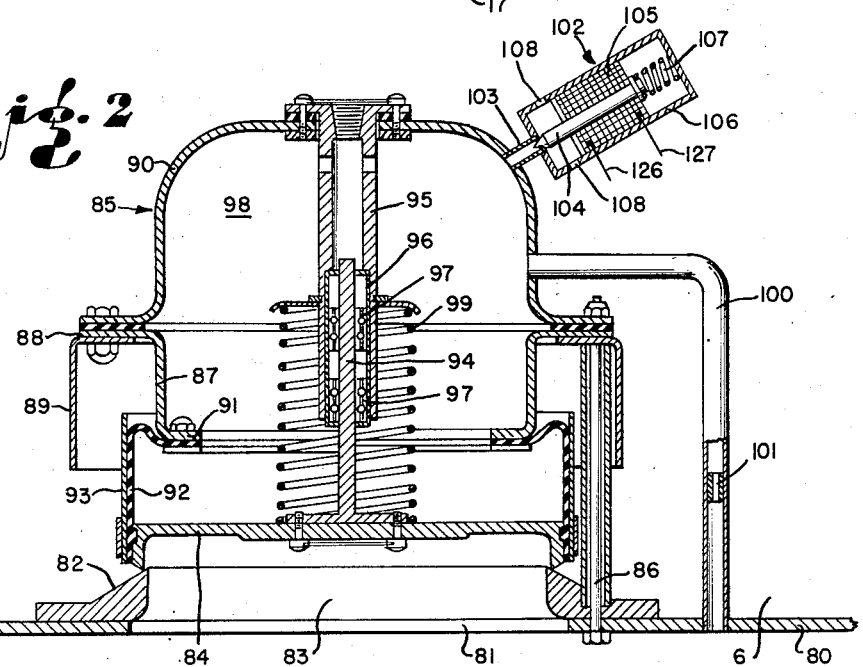
Fig. 2 is a diagrammatic section of an alternative arrangement.

Referring to Fig. 2, there is shown an aircraft cabin wall 80 having an outlet opening 81 surrounded by a valve seat 82 having an opening 83 in register with the outlet opening 81. The openings 83 and 81 constitute an outflow opening for the escape of air from the cabin which is controlled by a valve member 84 of a flow valve assembly indicated generally at 85. The valve assembly is secured to the outer side of the cabin wall 80 by bolts 86. The valve assembly 85 includes a centrally located Z-sectioned annular casing member 87 supported in spaced relation to the valve seat 82, said Z-sectioned member 87 including an outwardly extending annular flange 88 to which is attached a collar 89 and a cup-shaped cover 90.

Between the valve member 84 and the inturned flange 91 of the Z-sectioned member 87 is a flexible diaphragm 92 which is generally cylindrical in shape and about a portion of which is disposed a diaphragm guide or collar 93. The valve member 84 is provided with an axial stem 94, the free end of said stem extending into an aligned fixed tubular sleeve or guide 95. There is a linear ball bearing assembly 96 in the guide 95 in which are axially spaced ball and race assemblies 97 to reduce the friction between the stem and guide. The valve 84, diaphragm 92, Z-sectioned member 87, and cap 90 define a pressure chamber 98, and a spring 99 is provided within the chamber 98 for urging the valve 84 in the closing direction. The air pressure in the chamber 98 also urges the valve in the closing direction, and cabin pressure urges the valve 84 in the opening direction. The chamber 98 is in communication with the cabin by means of a conduit 100 having a calibrated restricted orifice 101 therein so as to provide a slow bleed into the chamber 98 from a region of high pressure. The chamber 98 is adapted to be connected with atmosphere by means of a valve, indicated generally at 102. There is a passage 103 connected to the chamber 98, and said passage is controlled by a movable valve member 104 adapted to be actuated by a solenoid coil 105 within the valve casing 106. The valve member or solenoid plunger 104 is urged in the closing direction by a spring 107, and air may escape from the chamber 98 when the valve 104 is opened, by way of the passage 103 and ports 108 in the valve casing 106.

Referring to Fig. 4, the wire 47 from the battery 45 leads to a double pole, double throw landing gear switch, indicated generally at 115, which is automatically operated. The wire 47 is connected to the movable switch members or blades 116 and 117 which are interconnected at 118 for simultaneous movement. The wire 47 also is connected to a movable switch member 119 of a double pole, double throw auxiliary vent switch, indicated generally at 120. The landing gear switch 115 includes a pair of fixed contacts Ca, Oa, and also includes a pair of fixed contacts Cb and Ob. The contacts Ca and Oa are adapted to be engaged by the movable switch member 116, and the contacts Cb and Ob are adapted to be engaged by the switch member 117. The contact Cb is connected to the movable contact 51 of the manual override switch 52 by a wire 121, and the contact C of the switch 52 is connected by a wire 122 to movable switch member 123 of the switch 120. The switch members 119 and 123 are connected to the movable switch member 57 of the auxiliary vent control switch 58 and are actuated in a manner similar to the actuation of the switch member 54 as above described.

The fixed contacts Oa of the switches 115 and 120 are interconnected by a wire 125 which branches at 126 to the respective solenoid coils of the valves 102 of the auxiliary regulator units 85. There are two main regulator units 10 and two auxiliary regulator units shown herein, although the number of units will depend on the requirements of the particular installation as in the case of the arrangement shown in Fig. 3.

In Fig. 4 the solenoid coils of the valves 102 are interconnected by a wire 127 which is grounded at 128.

In this figure the main regulators 10 are provided with jacks 130 which are electrically operated by motors, said motors being interconnected by wire 131 which is grounded at 132 in the usual manner.

The fixed contacts Ca of the switches 115 and 120 have no wire connections. The fixed contact Ob of the switch 115 is connected to the fixed contact Ob of the switch 120 by a wire 133, the contact O of the switch 52 being connected by a wire 134 to said wire 133. The latter wire is connected to one side of the motors of the jacks 130 by wires 135 and 136. The fixed contact Cb of the switch 120 is connected to the other side of the motors of the jacks 130 by wires 137 and 138.

When the plane lands, the switch members 116 and 117 are actuated to effect operation of the jacks 130 to positively open the main outflow valves of the main regulators 10. At the same time the solenoid operated valves 102 are opened so that the chambers 98 of the auxiliary regulators 85 communicate freely with atmosphere. The outflow of air from the chambers 98 is more rapid than the inflow permitted by the restriction 101, and the differential pressure between the cabin pressure and the pressure in the chambers 98 overcomes the closing force of the springs 99 and effects movement in the opening direction of the main valves 84 of the auxiliary regulators. As the take-off is made, the jacks 130 are operated to permit movement in the closing direction of the valves of the main regulators 10 and at the same time the solenoid operated valves 102 close to cut off communication between the chambers 98 and atmosphere. Thereafter there is a slow bleed into the chambers 98 from the cabin, and the pressure in said chambers 98 is thereby slowly built up so as to effect closing of the valves 84 in cooperation with the springs 99. In general, the operation of the system shown in Figs. 2 and 4 is the same as that shown in Figs. 1 and 3; however, the auxiliary regulators 85 of Fig. 4 are not controlled by any movement of switch 52, but rather of switches 115 and 120. This switch 52 in Fig. 4 controls only the main regulators 10.

I claim:

1. In mechanism for controlling the pressure in an enclosure: a main pressure regulator having an outflow valve; electrically operable means for controlling opening and closing of said valve; an auxiliary regulator including a movable pressure sensitive control element subjected on one side to enclosure pressure; walls defining a pressure chamber, the other side of said control element being subjected to pressure in said chamber for controlling the outflow of air from said enclosure; a restricted connection between said chamber and the enclosure; yielding means urging said pressure sensitive control element in a direction to effect the cutting off of the outflow of air through the auxiliary regulator; electrical means for controlling the auxiliary regulator so as to effect movement of said control element in opposite directions; an electrical system connected to said electrical means for controlling same and adapted to be connected to a source of electrical energy; an automatic landing gear switch in said electrical system adapted to control said electrical means so as to effect opening movement of the valve of the main regulator and movement of the pressure sensitive element in the opening direction when the landing gear is lowered and vice versa; an auxiliary vent door control means including a switch for controlling said electrical means so as to effect opening movement of the valve of the main regulator and movement of said pressure sensitive element in opening direction when the landing gear is lowered and vice versa; and a manual override switch for controlling said electrical means to effect opening and closing of the main and auxiliary regulators.

2. In mechanism for controlling the pressure in an enclosure: a main pressure regulator having an outflow valve; electrically operable means for controlling opening and closing of said valve; an auxiliary regulator including a movable pressure sensitive control element subjected on one side to enclosure pressure; walls defining a pressure chamber, the other side of said control element being subjected to pressure in said chamber for controlling the outflow of air from said enclosure; a restricted connection between said chamber and the enclosure; yielding means urging said pressure sensitive control element in a direction to effect the cutting off of the outflow of air through the auxiliary regulator; electrical means for controlling the auxiliary regulator so as to effect movement of said control element in opposite directions; an electrical system connected to said electrical means for controlling same and adapted to be connected to a source of electrical energy; an automatic landing gear switch in said electrical system adapted to control said electrical means so as to effect opening movement of the valve of the main regulator and movement of the pressure sensitive element in the opening direction when the landing gear is lowered and vice versa; and an auxiliary vent door control means including a switch for controlling said electrical means so as to effect opening movement of the valve of the main regulator and movement of said pressure sensitive element in opening direction when the landing gear is lowered and vice versa.

3. In mechanism for controlling the pressure in an enclosure: a main pressure regulator having an outflow valve; electrically operable means for controlling opening and closing of said valve; an auxiliary regulator including a movable pressure sensitive control element subjected on one side to enclosure pressure; walls defining a pressure chamber, the other side of said control element being subjected to pressure in said chamber for controlling the outflow of air from said enclosure; a restricted connection between said chamber and the enclosure; yielding means urging said pressure sensitive control element in a direction to effect the cutting off of the outflow of air through the auxiliary regulator; electrical means for controlling the auxiliary regulator so as to effect movement of said control element in opposite directions; an electrical system connected to said electrical means for controlling same and adapted to be connected to a source of electrical energy; and an automatic landing gear switch in said electrical system adapted to control said electrical means so as to effect opening movement of the valve of the main regulator and movement of the pressure sensitive element in the opening direction when the landing gear is lowered and vice versa.

4. In mechanism for controlling the pressure in an enclosure: a main pressure regulator having an outflow valve; electrically operable means for controlling opening and closing of said valve; an auxiliary regulator including a movable pressure sensitive control element subjected on one side to enclosure pressure; walls defining a pressure chamber, the other side of said control element being subjected to pressure in said chamber for controlling the outflow of air from said enclosure; a restricted connection between said chamber and the enclosure; yielding means urging said pressure sensitive control element in a direction to effect the cutting off of the outflow of air through the auxiliary regulator; electrical means for controlling the auxiliary regulator so as to effect movement of said control element in opposite directions; an electrical system connected to said electrical means for controlling same and adapted to be connected to a source of electrical energy; and an auxiliary vent door control means including a switch for controlling said electrical means so as to effect opening movement of the valve of the main regulator and movement of said pressure sensitive element in opening direction when the landing gear is lowered and vice versa.

5. In mechanism for controlling the pressure in an enclosure: a main pressure regulator having an outflow valve; electrically operable means for controlling opening and closing of said valve; an auxiliary regulator including a movable pressure sensitive control element subjected on one side to enclosure pressure; walls defining a pressure chamber, the other side of said control element being subjected to pressure in said chamber for controlling the outflow of air from said enclosure; a restricted connection between said chamber and the enclosure; yielding means urging said pressure sensitive control element in a direction to effect the cutting off of the outflow of air through the auxiliary regulator; electrical means for controlling the auxiliary regulator so as to effect movement of said control element in opposite directions; an electrical system connected to said electrical means for controlling same and adapted to be connected to a source of electrical energy; and a switch in said electrical system adapted to control said electrical means so as to effect opening movement of the valve of the main regulator and movement of the pressure sensitive element in the opening direction and vice versa.

6. In mechanism for controlling the pressure in an enclosure, including: a balanced valve for controlling the flow of air; a pressure sensitive control element subjected on one side to enclosure pressure, said pressure sensitive element being operatively connected with said valve; walls defining a pressure chamber, the other side of said control element being subjected to pressure in said chamber; a calibrated restricted connection between said chamber and the enclosure; yielding means urging the pressure sensitive element in a valve closing direction; and an electrically operated jack for effecting positive opening of said valve.

7. In mechanism for controlling the pressure in an enclosure, including: a balanced valve for controlling the flow of air; a pressure sensitive control element subjected on one side to enclosure pressure, said pressure sensitive element being operatively connected with said valve; walls defining a pressure chamber, the other side of said control element being subjected to pressure in said chamber; a calibrated restricted connection between said chamber and the enclosure providing the sole communicating means with the interior of said control chamber; yielding means urging the pressure sensitive element in a valve closing direction; and means for positively opening said balanced valve.

8. In mechanism for controlling the pressure in an enclosure: a main pressure regulator having an outflow valve; electrically operable means for controlling opening and closing of said valve; an auxiliary regulator including a balanced valve for controlling the outflow of air from the enclosure; a movable pressure sensitive control element connected to said balanced valve, subjected on one side to enclosure pressure; walls defining a pressure chamber, the other side of said control element being subjected to pressure in said chamber for controlling the outflow of air from said enclosure; a restricted calibrated connection between said chamber and the enclosure; yielding means urging said pressure sensitive element and balanced valve in the valve closing direction; electrical means for effecting positive opening of the auxiliary regulator valve; and means for controlling said electrical means whereby to control the operation thereof.

9. In mechanism for controlling the pressure in an enclosure: a main pressure regulator having an outflow valve; electrically operable means for controlling opening and closing of said valve; an auxiliary regulator including a movable valve element responsive to variations in the differential of pressure on opposite sides thereof and subjected on one side to enclosure pressure; walls defining a pressure chamber, the other side of said movable valve element being subjected to pressure in said chamber; a restricted connection between said chamber and enclosure; yielding means urging said valve element in the closing direction; electrical means operable to effect opening of said movable valve element; an electrical system connected to said electrical means for controlling same and adapted to be connected to a source of electrical energy; and switch means for controlling the electrical system so as to effect opening movement of the main and auxiliary regulator valves and vice versa.

10. In mechanism for controlling the pressure in an enclosure: a main pressure regulator having an outflow valve; electrically operable means for controlling opening and closing of said valve; an auxiliary regulator including a movable valve element responsive to variations in the differential of pressure on opposite sides thereof and subjected on one side to enclosure pressure; walls defining a pressure chamber, the other side of said movable valve element being subjected to pressure in said chamber; a restricted connection between said chamber and enclosure; yielding means urging said valve element in the closing direction; a connection between the chamber and atmosphere; electrical means for controlling said atmospheric connection and comprising an electrically operated valve; an electrical system connected to said electrical means of the main and auxiliary regulators; and switch means for controlling said electrical system.

11. In mechanism for controlling the pressure in an enclosure, including: a balanced valve for controlling the flow of air; a pressure sensitive control element subjected on one side to enclosure pressure, said pressure sensitive element being operatively connected with said valve; walls defining a pressure chamber, the other side of said control element being subjected to pressure in said chamber; a fixed calibrated restricted connection between said chamber and the enclosure providing the sole communicating means with the interior of said control chamber; yielding means urging the pressure sensitive element in a valve closing direction; and means for positively opening said balanced valve.

References Cited in the file of this patent
UNITED STATES PATENTS

| | | |
|---|---|---|
| 2,396,116 | Noxon | Mar. 5, 1946 |
| 2,405,670 | Price | Aug. 13, 1946 |
| 2,412,110 | Williams | Dec. 2, 1946 |
| 2,413,027 | Maxson | Dec. 24, 1946 |
| 2,449,231 | Jerger | Sept. 14, 1948 |
| 2,463,487 | Widgery et al. | Mar. 1, 1949 |
| 2,477,005 | Paget | July 26, 1949 |
| 2,484,852 | Paget | Oct. 18, 1949 |
| 2,491,270 | Kemper | Dec. 13, 1949 |
| 2,549,690 | Klemperer | Apr. 17, 1951 |